US006738726B2

(12) United States Patent
Guzman

(10) Patent No.: US 6,738,726 B2
(45) Date of Patent: May 18, 2004

(54) APPARATUS AND METHOD FOR MEASURING THE MAXIMUM SPEED OF A RUNNER OVER A PRESCRIBED DISTANCE

(75) Inventor: Rudy Guzman, Coral Springs, FL (US)

(73) Assignee: BBC International, Ltd., Boca Raton, FL (US)

( * ) Notice: Subject to any disclaimer, the term of this patent is extended or adjusted under 35 U.S.C. 154(b) by 357 days.

(21) Appl. No.: 09/732,321

(22) Filed: Dec. 7, 2000

(65) Prior Publication Data

US 2002/0099516 A1 Jul. 25, 2002

(51) Int. Cl.⁷ .......................... G01B 11/00; G06F 15/00
(52) U.S. Cl. ........................ 702/160; 702/142; 702/149
(58) Field of Search ................................. 702/160, 141, 702/142, 149, 96–97; 377/19, 24.2; 235/105

(56) References Cited

U.S. PATENT DOCUMENTS 6,243,659 B1 * 6/2001 Dominici et al. ........... 702/160
6,356,856 B1 * 3/2002 Damen et al. .............. 702/160

* cited by examiner

Primary Examiner—Kamini Shah
(74) Attorney, Agent, or Firm—Darby & Darby

(57) ABSTRACT

A method and apparatus for calculating, presenting, recalling and recording the maximum running speed of a user over a prescribed distance in miles per hour or meters per second. The result is shown in digital and iconic form on a liquid crystal display (LCD). The apparatus incorporates a micro-controller, a LCD, a motion sensor, press switches and, light emitting diodes. The motion sensor is used to generate a signal, in response to external motion, which is input to the micro-controller for use in a calculating the speed in accordance with a prescribed formula. Upon completion of running over a fixed time period or distance, a message is displayed on the LCD to indicated the maximum speed achieved by the user during an interval of the fixed time and over the prescribed distance. The apparatus may be adapted for use on shoes, a user's wrists, or the like, for the purpose of encouraging the user to run as fast as possible, and to ensure safety of the user at night.

35 Claims, 6 Drawing Sheets

(1)

(2)

APPARATUS AND METHOD FOR MEASURING THE MAXIMUM SPEED OF A RUNNER OVER A PRESCRIBED DISTANCE

BACKGROUND OF THE INVENTION

1. Field of the Invention

The present invention generally relates to pedometers and, more particularly, to an apparatus and method for measuring the maximum speed of a runner over a prescribed distance.

2. Description of the Related Art

Today, it is not uncommon for shoes to include entertaining and functional electronics. The electronics usually include a simple timing circuit and/or a movement-sensitive switch, a battery, and an array of LED-type lights. The electronic circuit of the type typically found in popular shoes today is used to illuminate the LEDs either at regular (or predetermined) intervals, or whenever the shoes are moved a predetermined degree, such as when the wearer walks, jumps, or runs. It appears that the primary purpose of the lighting circuit located in today's shoes is to entertain both the wearer of the shoes, and those in the vicinity. It also appears that the timing circuit and/or the movement-sensitive switch are experiencing increased use in determining the number of steps taken by a wearer of the shoe while walking, jumping or running.

Along with life style changes to increase personal health, the importance of walking is being emphasized to a greater extent. Many people wear a pedometer during routine daily exercise. While wearing the pedometer, a person can learn how many steps they took on a given day or during a specific time interval. With this information, the user can set their own target step count. By achieving this step count on a daily or regular basis, the user can maintain their physical health by walking and/or exercising in accordance with the target step count.

U.S. Pat. No. 6,021,351 to Kadhiresan et al. discloses an apparatus and method for assessing the effectiveness of changes in therapy upon a patient's well-being. According to this reference, the method involves the steps of affixing to the patient one or more sensors for sensing a parameter related to the patient's level of activity and for providing an electrical output signal corresponding to the activity level. The sensor produces a raw accelerometer output signal which is proportional to body movement of the patient. The output signal is sampled and filtered to insure that noise due to heart sounds and respiration are effectively removed from the accelerometer output signal. The absolute value of the accelerometer signal is then obtained and rectified and provided to an averager circuit to eliminate any high frequency noise signals which can contaminate the results. The output signal from the averager is then compared to a threshold level, and applied to a microprocessor which is programmed to execute an algorithm for assessing patient well-being and for optimizing patient well being.

According to U.S. Pat. No. 6,013,008 to Fukushima, a step count data control system is used to encourage a user to continue walking along a prescribed distance. Step count data is obtained while the user is walking and the progress and location of the user is objectively displayed on a map, based on the actual distance walked and the number of steps taken. A microprocessor is used to determine the average distance traveled over a specific time period, such as one month. The map is a chart, such as the map of Japan, which shows the present position being walked along from an assumed starting point. The distance from the start point to the present point is indicated on the map by color, or another suitable indicator.

A shoe having an indicator responsive to the activity of the person wearing the shoe is disclosed in U.S. Pat. No. 5,945,911 to Healy et al. A circuit board is imbedded in the typical athletic shoe so that it becomes a shoe with a built-in activity meter. According to this patent, the circuit board is preferably mounted inside the heel portion of the sole of the shoe and, more preferably, inside the heel portion of the mid sole. With this configuration, the heel of a wearer's foot will activate a switch located on the circuit board when the wearer is stepping, walking, jumping or running. Using LEDs, the highest level of activity reached by a wearer of the shoe is displayed. The display is a three-element LED display in which 0–3 LEDs flash briefly, but brightly each time the weight of the wearer is fully pressed against the inner sole of the shoe during a period of activity.

U.S. Pat. No. 5,807,283 to Ng discloses an electronic device for monitoring the activity of a wearer, his walking speed, as well as the distance traversed in a selected time interval. The claimed device uses magnets strapped to a leg or a shoe of a person and a hall effect sensor to calculate the distance traversed based on the output signal generated when the magnets pass each other.

U.S. Pat. No. 5,476,427 to Fujima discloses a pace display device which is worn by a person running or jogging. The device calculates and displays the person's pace data which was obtained while the person was running or jogging. According to this patent, by calculating and then displaying the pace difference between the present and immediately proceeding sections of a running course, the runner is able to confirm how fast or how slow his present pace is when compared to his immediately proceeding pace.

U.S. Pat. No. 4,510,704 to Johnson describes a boot or shoe which incorporates a pedometer into the heel of the shoe. The pedometer comprises a push button which is activated with each step. A counter responds to activation of the push button. According to this patent, the counter may be an electronic counter which displays the number of steps the wearer of the shoe takes while walking/running.

U.S. Pat. No. 4,466,204 to Wu describes a device for determining the number of steps and the distance walked by a person. According to the Wu patent a switch is disposed in a toe area of a shoe. This switch generates a pace signal in response to each step which is taken with the shoe.

U.S. Pat. No. 4,712,319 to Searcy discloses a portable self-contained computational device for use by a striding athlete, such as a jogger, which includes a stride length selector that permits the athlete to select a normal length of stride, and a rate selector which permits the athlete to preselect a desired rate of travel by striding.

Although much has been done in this field to introduce distance measurements and pace monitoring to footwear, none of these prior art devices is designed to measure the maximum speed achieved by a runner over a prescribed distance in order to motivate the wearer of the device to run as fast as possible. It is difficult to continue walking or running for a long period of time. Further, without knowing how fast they have run, a runner will have no way of knowing whether they are making progress toward maximizing their speed during an exercise session. Moreover, a runner can grow tired of walking or running without any external encouragement. Accordingly, there is a need and desire for a device with which to motivate a person to walk or run at maximum speeds to obtain the benefits associated with exercising.

SUMMARY OF THE INVENTION

The present invention is an apparatus and method for measuring the maximum speed of a runner over a prescribed distance. The console of the device comprises push buttons for activating and deactivating the device. Also included are LEDs which are used to display the status of the device and to flash in response to movement of a user wearing the device while running or walking. The device also includes a liquid crystal display (LCD) which displays various messages to the user, such as the last recorded speed achieved, the highest speed achieved and the average miles per hour achieved, respectively.

Initially, the device is in a "stand by" low power state. When a first button is momentarily pushed, such as for two seconds, a micro-controller located inside the device is placed in an "active on" state. As a result, the micro-controlled provides power to a motion sensor and a motion sensor amplifier. After a predetermined time delay, the LCD and LEDs each turn on to signify that the micro-controller is powered on and ready for use.

The LCD displays words which represent speeds achieved by a user of the device. In the preferred embodiment, the speeds are the last recorded speed achieved, the highest speed achieved in any interval over the distance run and the average miles per hour achieved over the distance, respectively. The display of the LCD comprises three "digits", each with seven segments for conveying the operational status of the device. In the preferred embodiment, the seven segments present the final running speed achieved in digital form, such as the maximum speed.

In response to each step taken by the user, a motion detector within the device causes the generation of a trigger signal which is amplified by transistors located inside the device, and forwarded to the micro-controller for use in a calculation in accordance with a predetermined relationship to determine the maximum speed of the user. With each generation of the trigger signal, the LEDs flash in a predetermined sequence. In an embodiment of the invention, the motion detector is a spring switch, a buzzer sensor, a metal ball sensor, or the like. In the preferred embodiment, the motion sensor is a buzzer sensor.

The device provides a method for measuring the maximum speed of a runner over a prescribed distance. The device may be adapted for use on shoes, the wrist of a user, etc. and provides a means with which to motivate a user to run as fast as possible over the prescribed distance, and to ensure safety of the runner at night.

BRIEF DESCRIPTION OF THE DRAWINGS

The foregoing and other advantages and features of the invention will become more apparent from the detailed description of the preferred embodiments of the invention given below with reference to the accompanying drawings in which.

DESCRIPTION OF ILLUSTRATIVE EXEMPLARY EMBODIMENTS

Figure 1:
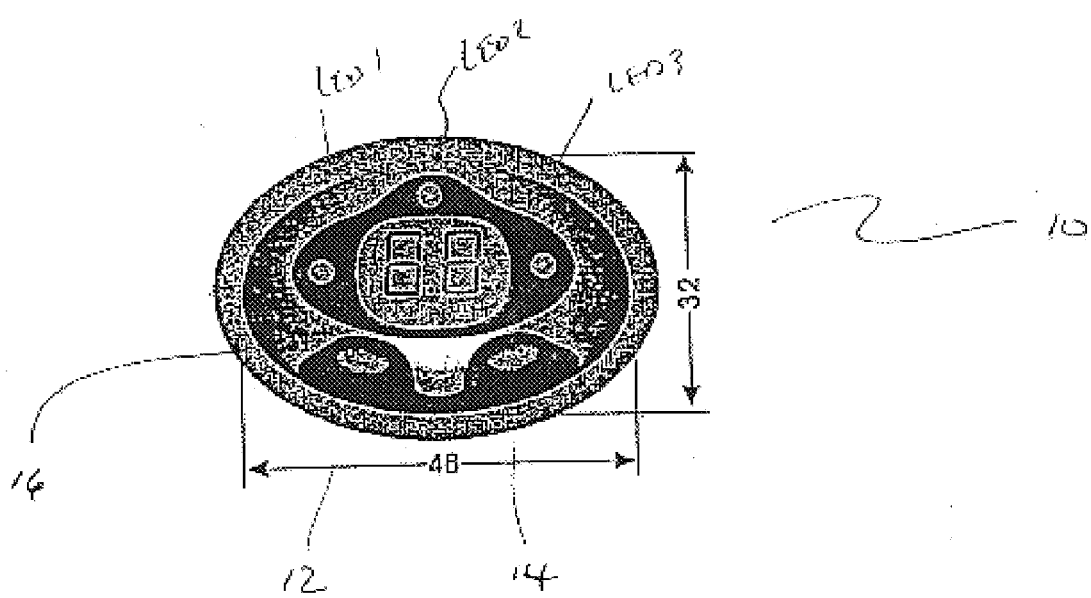
FIG. 1 is an illustration of a control panel for the device in accordance with a preferred embodiment of the invention.

FIG. 1 is an illustration of a control panel for the device 10 in accordance with a preferred embodiment of the invention. The console of the device 10 comprises push buttons 12 and 14 for activating and deactivating the device, respectively. Also included are LED1, LED2 and LED3, which are used to display the status of the device and to flash in response to movement of a user wearing the device while running or walking. The console of the device 10 also includes a liquid crystal display (LCD) 16 which displays various messages to the user, such as the last recorded speed achieved, the highest speed achieved and the average miles per hour achieved, respectively.

Figure 2:
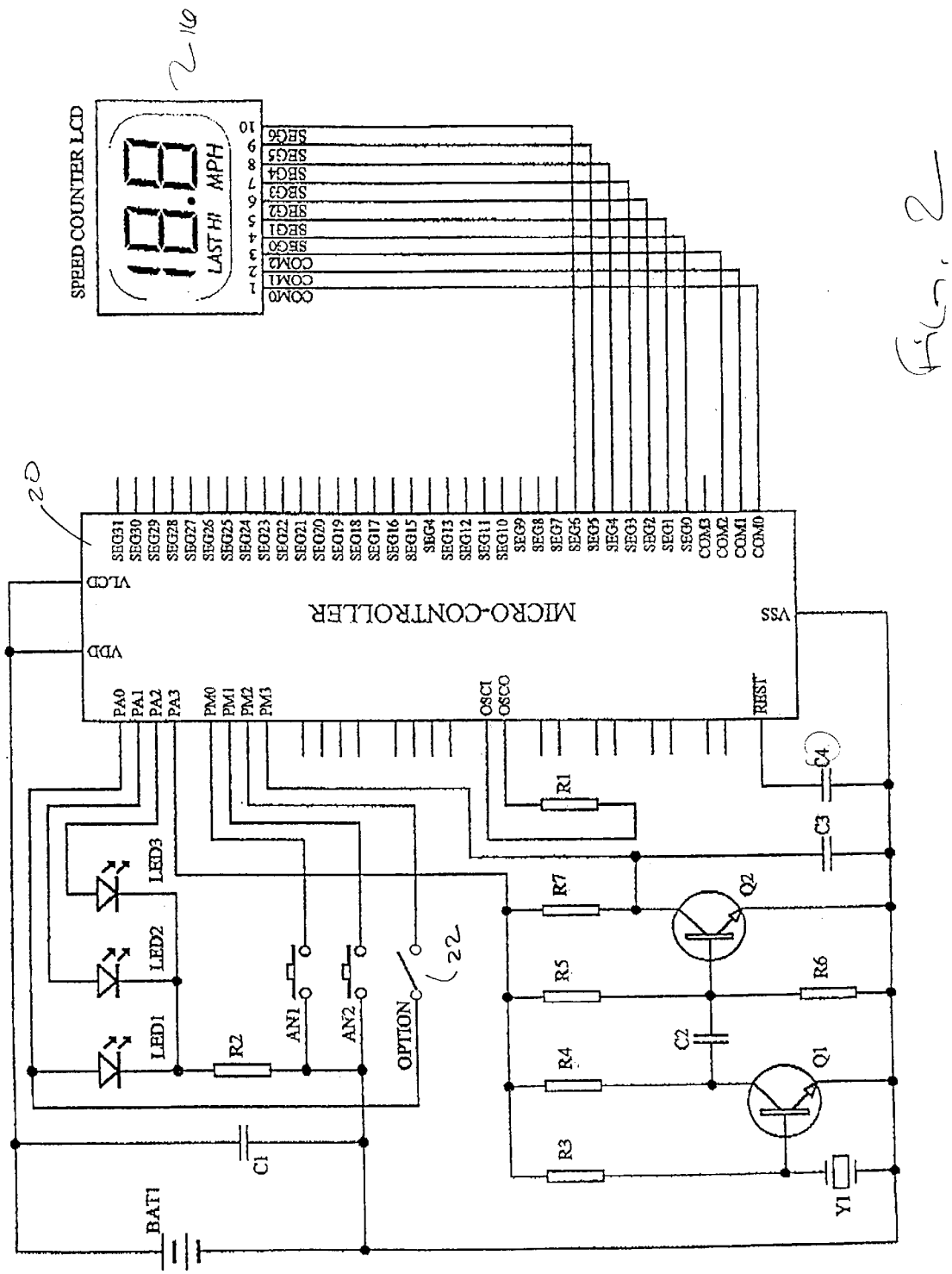
FIG. 2 is an exemplary schematic illustration of a circuit for calculating, presenting, recalling and recording the speed of a user over a prescribed distance in accordance with the invention.

FIG. 2 is an illustration of an exemplary circuit for calculating, presenting, recalling and recording a speed of a user over a prescribed distance. The principal element of the circuit is a micro-controller 20, which is capable of making calculations based on various inputs according to a stored program and is further capable of storing the results. The program and locations of the stored results are in memory units or registers of the micro-controller 20. Alternatively, the program and results can be stored in external memory units (not shown).

Initially, the micro-controller 20 is in a "standby" state. When switch AN1 is momentarily closed (as a result of button 12 being pushed), such as for two seconds, a signal is put on terminal PM0 of the micro-controller 20, which moves it into an "active" state from a power saving "standby" state. As a result, power is provided from output PA3 of the micro-controller 20 to a switch circuit comprising transistors Q1 and Q2. After a predetermined time delay, micro-controller 20 causes each of liquid crystal display (LCD) 16 as well as LED1, LED2 and LED3 to turn on in order to signify that the micro-controller 20 is in the active state and is ready for use. In the preferred embodiment, the predetermined time delay is approximately one second.

Similarly, the micro-controller 20 can be changed from the standby state to the active state by closing switch AN2. Closing this switch causes a signal to be applied to terminal PM1 of the micro-controller 20. This also has the effect of causing the micro-controller 20 to apply power to the switch amplifier circuit made up of transistors Q1 and Q2. However, using switch AN2 instead of AN1 causes the microprocessor to be in a different operational mode.

The LCD 16 has a display comprised of three digits, each with seven segments for conveying the speed information. Further, the LCD displays words which indicate the type of speed information being indicated by the digits, e.g., the last recorded speed achieved, the highest speed achieved and the average speed, all in miles per hour, respectively.

Resistor R1 is connected between the OSC0 and OSC1 terminals of the micro-controller 20 to establish the frequency rate for an internal oscillator that sets the timing in the micro-processor. One terminal of LED1, LED2 and LED3 are connected to respective outputs PA0, PA1 and PA2 of the micro-controller 20. The other terminal of each of these LEDs are connected together and to a resistor R2 which limits current flow through these LEDs when power is applied to them from the PA outputs of micro-controller 20. A capacitor C1 located across a battery BAT1 provides power to the entire circuit, with the capacitor reducing noise spikes in the power supply line. Capacitor C4 is used to reset micro-controller 20 when the power from BAT1 is applied.

The LEDs are lighted by the micro-controller 20 in various sequences at a rate determined by the internal oscillator. The pattern in which the LEDs light depend on the state of the micro-controller, e.g., whether a new high speed has been calculated. However, these patterns can be changed to alternative patterns by operation of OPTION switch 22.

Transistors Q1 and Q2 form an amplifier circuit that has power supplied to the transistors from PA3 through R4 and R7. A bias voltage to the input of transistor Q1 and a motion detector Y1 is provided from output PA3 of micro-controller 20 though resistor R3. Similarly, a bias voltage is applied to the input of transistor Q2 from PA3 through resistors RS and R6. The amplifier output from the collector of Q2 is applied to input terminal PM3 of micro-controller 20. A capacitor C3 filters this output. In response to each step taken by the user, the motion detector Y1 generates a trigger signal at the input of Q1. This signal is amplified in Q1 and Q2 and delivered to PM3 of micro-controller 20, where it is used to calculate the speed of the user.

With each generation of the trigger signal, the LEDs flash in a predetermined sequence. In the preferred embodiment, the predetermined sequence comprises first lighting LED1, followed by lighting of LED2 and finally the lighting of LED3. The timing of the sequence is under the control of the internal oscillator of the micro-controller 20, whose frequency is controlled by the value of R1. The micro-controller 20 calculates the various speed values based on the elapsed time, as determined by the internal oscillator, between trigger signals and the average stride of the user. The calculations of the various speed values are then stored, and converted into signals for driving the LCD 16 to display the speed value and identify the type of speed information that is being displayed. The outputs COM0 to COM2 as well as SEG0 to SEG6 of micro-controller 20 drive the seven elements of each digit of the three digit LCD display 16 and cause the text description of the calculation to be displayed.

In embodiments of the invention, the motion detector Y1 may be a spring switch, a buzzer sensor, a metal ball sensor, or the like. In the preferred embodiment the motion sensor is a buzzer sensor.

Figure 4A:
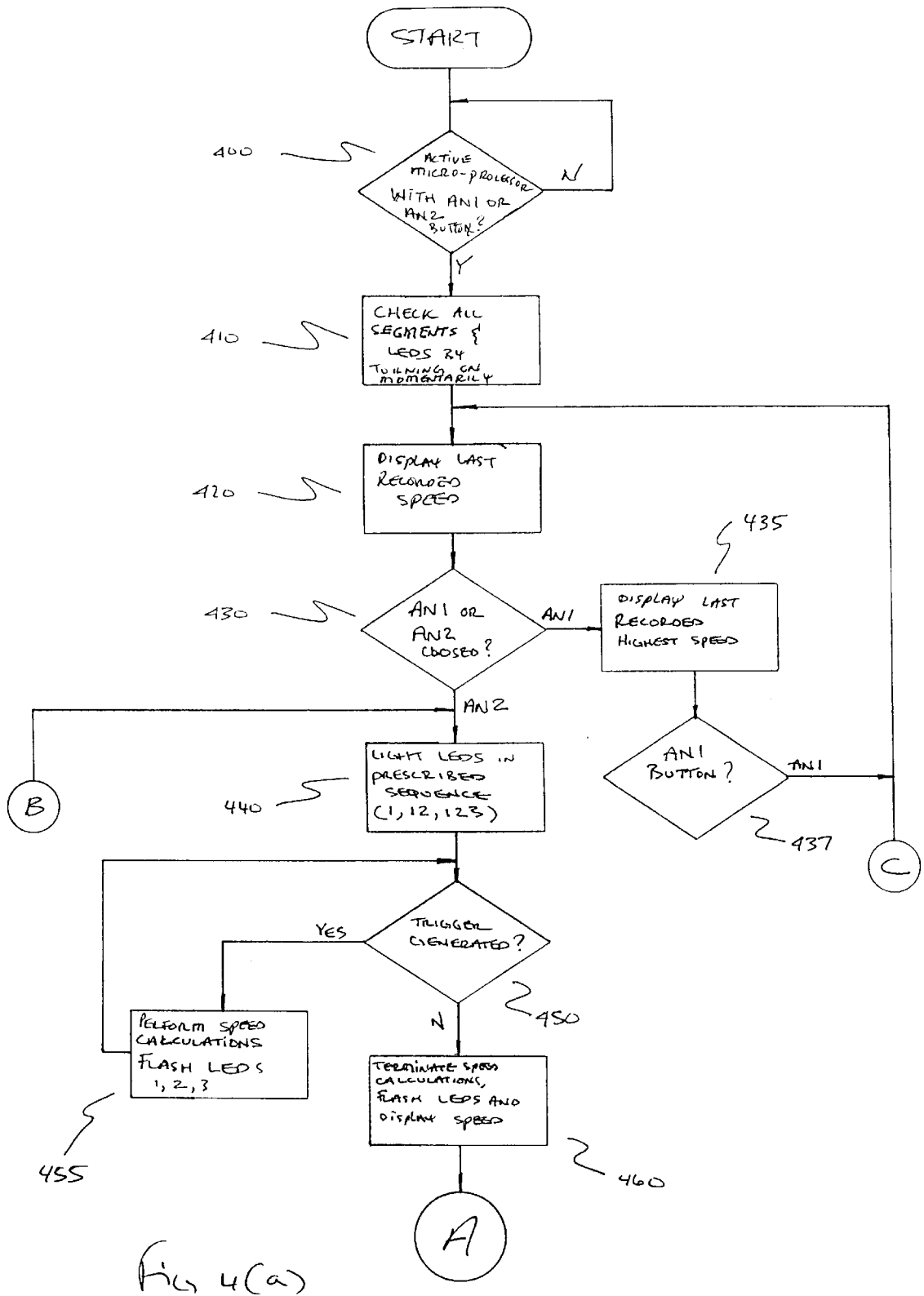
FIGS. 4(a) and 4(b) are flow charts illustrating a preferred embodiment of the method of the invention.
Figure 4B:
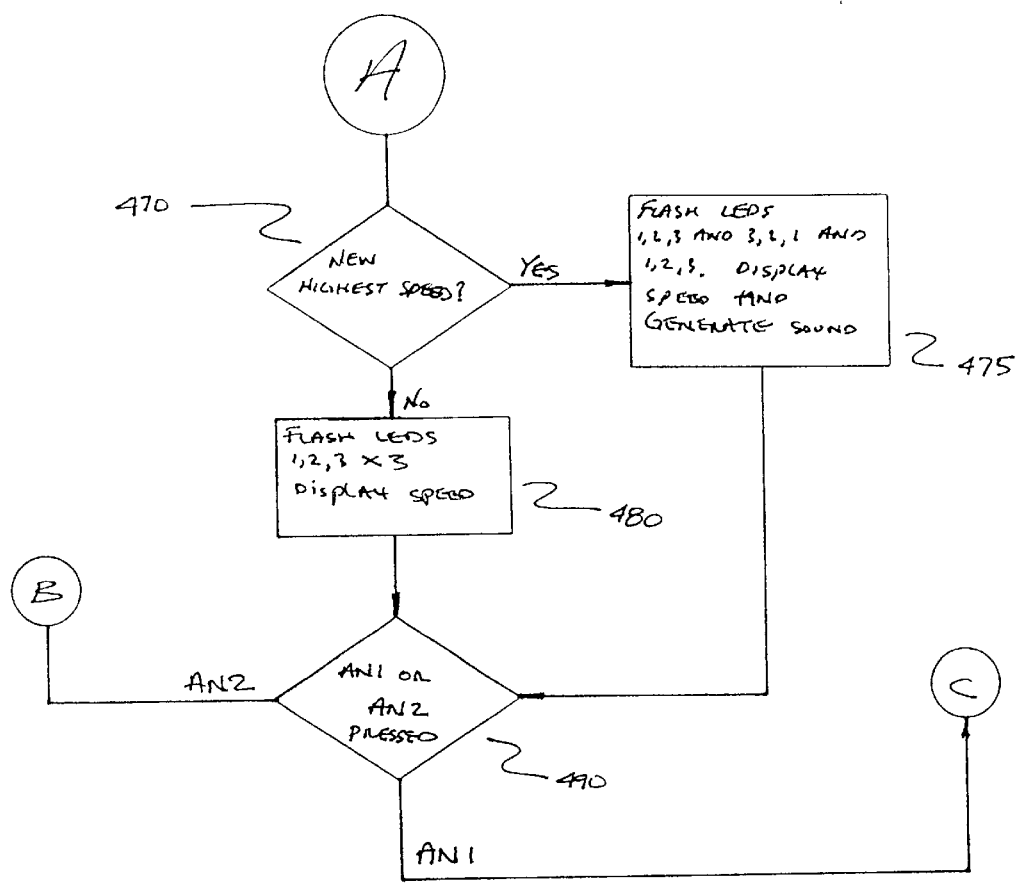

FIGS. 4(a) and 4(b) are flow charts illustrating a preferred embodiment of the method of the invention. The micro-controller 20 is in a powered down state until switch AN1 is closed. The micro-controller 20 is activated upon the closure of the AN1 switch, as indicated in step 400. Upon activation of the micro-controller 20, a test is performed, which comprises momentarily flashing the LEDs and momentarily lighting the LCD segments to indicate that the micro-controller 20 is powered and ready for use, i.e., is an active mode. This test determines whether all the segments of the LCD 16 are functioning properly, as indicated in step 410. In the preferred embodiment, the LEDs are flashed and the segments are lit for approximately one second. This timing is controlled by the internal oscillator.

Figure 3A:
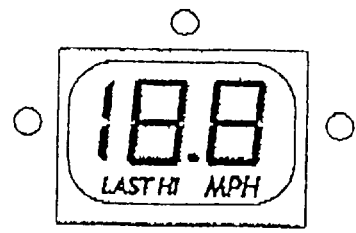
FIGS. 3(a) through 3(g) are block diagrams illustrating a display of the LCD of the console of FIG. 1.
Figure 3B:
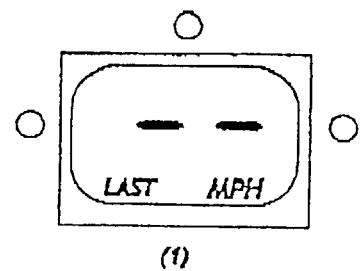
Figure 3C:
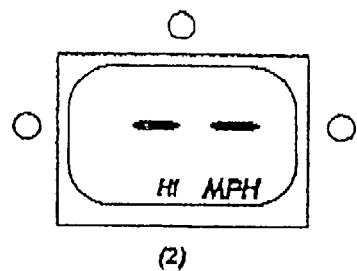
Figure 3D:
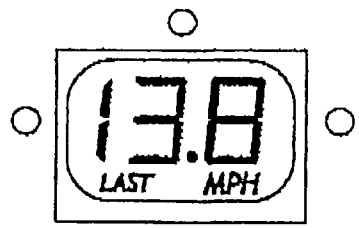
Figure 3E:
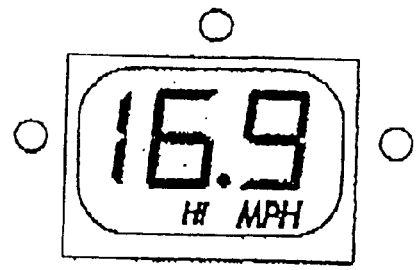

Next, the last recorded result is displayed on the LCD 16, as indicated in step 420. If the device is being used for the first time, the exemplary message shown in FIG. 3(a) is displayed on the LCD 16. Otherwise, the LCD will display the last recorded mileage, such as the mileage as shown in FIG. 3(d).

A check is performed to determined whether switch AN1 or AN2 was closed, as indicated in step 430. If the AN1 switch is closed, the last recorded highest speed is recalled and displayed, as indicated in step 435. Here, repeated closure of the AN1 switch will cause the recall and display of the last recorded highest speed, as indicated in step 437.

If the AN2 switch is closed, the LEDs are lit in a prescribed sequence, or an audible sound is generated in a manner which is known, to indicated that the micro-controller 20 is ready to perform speed calculations, as indicated in step 440. In the preferred embodiment, the prescribed sequence comprises first lighting LED1, then simultaneously lighting LED1 and LED2, and finally simultaneously lighting LED1, LED2 and LED3.

A check is performed to determine whether trigger signals associated with movement of the device 10 are input to the micro-controller 20, as indicated in step 450. If the micro-controller 20 receives trigger signals, speed calculations are performed in response to the trigger signals and the LEDs flash in accordance with a predetermined sequence, as indicated in step 455. In the preferred embodiment, the predetermined sequence comprises first lighting LED1, lighting LED2, and then lighting LED3. With each step taken by the user, the motion sensor Y1 causes generation of the trigger signal which is amplified by transistors Q1 and Q2 (FIG. 2), and forwarded to the micro-controller 20 for calculation of the speed of the user in accordance with the relationship:

$$V = \frac{1}{n}\sum_{i=1}^{n} \frac{d}{t_i} \qquad \text{Eq. 1}$$

where $$T = \sum_{i=1}^{n} t_i,$$

d is the distance between each step, n is the total number of steps in the total running time T and $t_i$ is the time between steps taken by the user.

The total distance can be broken up into a plurality of intervals which together make up the distance traveled. Then the speed in each interval can be calculated using equation (1). At the end of the exercise, the maximum of the speeds in the various intervals can be displayed.

Figure 3F:
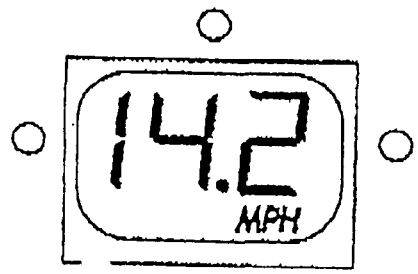
Figure 3G:
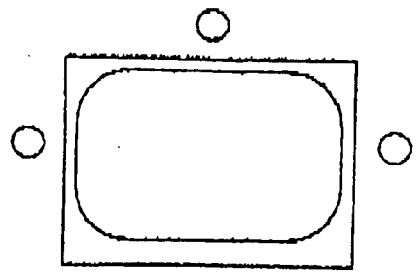

If the micro-controller 20 fails to receive a trigger signal for an extended period of time or fails to receive a trigger signal during an allotted time period, the calculation of the running speed is terminated, the LEDs are simultaneously flashed in phase at least once, and the speed achieved by the user is displayed on the LCD (FIG. 3(f)), as indicated in step 460. In the preferred embodiment, the extended period of time is approximately 1.5 seconds, the allotted time is approximately 20 seconds, and the LEDs are flashed approximately three times.

A check is performed to determine whether the calculated speed is the highest recorded speed of the user, as indicated in step 470. If the calculated speed is a new highest speed, a predetermined flashing pattern is started, a congratulatory sound is generated in a manner which is known and the speed is displayed on the LCD (FIG. 3(c)), as indicated in step 475. In the preferred embodiment, the flashing pattern comprises first lighting LED1, lighting LED2, and lighting LED3. Second, lighting LED3, lighting LED2, and lighting LED1. Third, lighting LED1, lighting LED2, and lighting LED3.

If on the other hand, the calculated speed is not the new highest speed, then an alternative flashing sequence is performed, and the speed is displayed on the LCD (FIG. 3(a)), as indicated in step 480. In the preferred embodiment, the alternative flashing sequence comprises lighting LED1, lighting LED2, then lighting LED3, in succession approximately three times.

A check is performed to determined whether the AN1 switch or the AN2 switch has been closed, as indicated in step 490. If the AN1 switch was closed, then a return to step 420 occurs, and the LCD 16 displays the last recorded speed of the user. If the AN2 switch was closed, a return to step 440 occurs, and the LEDs are lit in accordance with the prescribed sequence or the audible sound is generated in a manner which is known to indicated that the micro-controller is ready to perform speed calculations. In the preferred embodiment, the prescribed sequence involves first lighting LED1, then simultaneously lighting LED1 and LED2, and finally simultaneously lighting LED1, LED2 and LED3.

If the micro-controller 20 does not receive an input signal (i.e., the trigger signal or the closure of the AN1 or AN2 switches) for an extended period of time, such as ten seconds, it will power down and enter the standby mode. In stand by mode, if the AN1 switch is closed, the micro-controller 20 will awaken and a return to step 420 will occur, where the LCD will display the last recorded speed achieved by the user.

If the AN2 switch is closed for an extended period, such as for three seconds, the LED sequence flashing feature during running will be deactivated to conserve energy. To restore the LED sequence flashing feature, the AN2 switch must be closed for another extended period when the micro-controller 20 is in the active mode.

In an embodiment of the invention, other characteristics of the user, such as the length of a user's foot, the distance between each step, or the like, are added to the relationship shown in Eq. 1 such that highly accurate speed calculations are obtained. This information can be input when the microprocessor is in a proper mode by buttons 12, 14.

In another embodiment of the invention, another result, such as a user's height, is obtained by adjusting the relationship between time (t), distance (d) and number of steps/motion (n) in Eq. 1. This is based on the assumption that the stride of the user is related to the user's height.

In a further embodiment of the invention, sound and an animated figure are added to the messages which are displayed on the LCD to enhance the commercial value and attraction of the device.

The device provides a method for measuring the maximum speed of a runner over a prescribed distance. The device may be adapted for use on shoes, the wrist of a user, etc. and provides a means with which to motivate a user to run as fast as possible over the prescribed distance, and to ensure safety of the runner at night.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Apparatus for determining maximum speed of a user over a distance including a plurality of intervals, comprising:
    a motion sensor which generates a stride signal whenever the user takes a stride;
    a processor storing a distance value for the user's stride, measuring the amount of time between stride signals, calculating the interval speed of the user during each interval over the distance by multiplying the distance value for the user's stride by the number of strides during the interval to achieve an interval distance result, and dividing the interval distance result by the time period of the interval which is equal to the sum of the interval times for the interval, and
    a display device for displaying the maximum interval speed.

2. The apparatus of claim 1, wherein said motion sensor is one of a spring switch, a buzzer sensor and a metal ball sensor.

3. The apparatus of claim 1, wherein said display is a liquid crystal display (LCD) with at least three digits to display the maximum speed in an interval.

4. The apparatus of claim 1 wherein said processor is an integrated circuit micro-controller.

5. The apparatus of claim 1, further including at least one light which flashes whenever a stride signal is generated by the motion sensor.

6. The apparatus of claim 1, wherein said processor alternatively causes said display to display the last recorded speed and a text message which indicates that it is the last recorded speed in response to a first switch activation.

7. The apparatus of claim 5, wherein said at least one light includes a plurality of light emitting diodes which are lighted in a pattern depending on the results of a calculation by the processor when a second switch has been activated.

8. The apparatus of claim 1, wherein said processor calculates the average speed over the distance by multiplying the total number of strides over the distance by the user's stride and dividing by the sum of the time intervals over the distance.

9. The apparatus of claim 7, wherein said display indicates in a text message when it is displaying the maximum speed, and alternatively displays the average speed and a text message which indicates when it is displaying the average speed.

10. The apparatus of claim 1, further including a motion sensor amplifier located between the motion sensor and the processor to amplify the signals from the motion sensor.

11. The apparatus of claim 10, further including a first switch, wherein operation of the first switch causes the processor to go from a standby state in which no power is applied to the motion sensor amplifier to an active state in which power is applied to the motion sensor amplifier; and
    wherein said processor alternatively causes said display to display the last recorded speed and a text message which indicates that it is the last recorded speed in response to activation of said first switch.

12. The apparatus of claim 10, further including a plurality of light emitting diodes and a second switch,
    wherein operation of said second switch causes the processor to go from a standby state in which no power is applied to the motion sensor amplifier to an active state in which power is applied to the motion sensor amplifier; and
    further causes said plurality of light emitting diodes to lighted in a pattern depending on the results of a calculation by the processor.

13. The apparatus of claim 10, wherein said motion sensor amplifier is a two stage transistor amplifier.

14. A method of determining the maximum speed of a user over a distance, comprising the steps of:
    obtaining user stride distance value;
    using a motion sensor attached to the user to determine when the user has made a stride by recording stride signals generated by the motion sensor upon a stride;
    measuring the stride time between strides by measuring the times between stride signals;
    calculating interval speeds of the user, during each of a plurality of intervals that make up the distance, by multiplying the user stride distance value by the number of strides during the interval to achieve an interval distance result, and dividing the interval distance result by the sum of the stride times in an interval; and identifying the maximum interval speed over the distance.

15. The method of determining the maximum speed of a user over a distance as set forth in claim 14, further including the step of displaying the maximum interval speed.

16. The method of determining the maximum speed of a user over a distance as set forth in claim 15, further including the steps of:
    calculating the average speed over the distance; and
    alternatively displaying the average speed and a text indication that the average speed is being displayed instead of the maximum interval speed.

17. The method of determining the maximum speed of a user over a distance as set forth in claim 16, further including the steps of:
    displaying the last speed and a text indication that the last speed is being displayed in response to the activation of a first switch.

18. The method of determining the maximum speed of a user over a distance as set forth in claim 14, wherein the step of calculating occurs in response to the activation of a second switch.

19. The method of determining the maximum speed of a user over a distance as set forth in claim 18, wherein the plurality of LEDs light in a predetermined sequence in response to the completion of a calculation.

20. The method of determining the maximum speed of a user over a distance as set forth in claim 19, wherein the LEDs light in response to the stride signals.

21. A method for using a pedometer to determine the maximum speed of a user over a distance, comprising the steps of:
    changing a state of a micro-controller from standby to active using a first switch;
    flashing a plurality of LEDs and lighting a liquid crystal display on the pedometer to indicate that the micro-controller in the pedometer is ready for use;
    displaying a last recorded speed on the liquid crystal display;
    checking to determine whether the first switch or a second switch is closed;
    lighting the LEDs in accordance with a prescribed sequence, if the second switch is closed;
    checking to determine whether the motion sensor has generated a trigger signal;
    continuously performing speed calculations and flashing the LEDs in accordance with a predetermined sequence, if a trigger signal has been generated; and
    displaying a maximum speed achieved over the distance.

22. The method of claim 21, further comprising the steps of:
    terminating speed calculations, if the trigger signal is not generated within one of an extended period of time and an allotted time period; and
    simultaneously flashing the plurality of LEDs and displaying the speed of the user.

23. The method of claim 21, further comprising the step of:
    determining whether a new highest speed has been achieved by the user; and
    flashing the plurality of LEDs in a predetermined pattern, sounding a congratulatory sound, and displaying the new highest speed achieved by the user, if the new highest speed has been achieved.

24. The method of claim 23, further comprising the steps of:
    determining whether the first switch or the second switch has been closed;
    returning to the step of displaying the last recorded speed on the liquid crystal display, if the first switch has been closed; and
    returning to the step of lighting the plurality of LEDs in accordance with the prescribed sequence, if the second switch has been closed.

25. The method of claim 23, further comprising the steps of:
    displaying a last recorded highest speed, if the first switch has been closed; and
    returning to the step of displaying the last recorded speed on the liquid crystal display.

26. The method of claim 21, wherein the step of flashing the plurality of LEDs and lighting the comprises lighting the LEDs and segments of the liquid crystal display for approximately one second.

27. The method of claim 21, wherein the plurality of LEDs comprises a first LED, a second LED and a third LED.

28. The method of claim 27, wherein the prescribed sequence comprises the steps of:
    lighting a first LED;
    simultaneously lighting the first LED and the second LED; and
    simultaneously lighting the first LED, the second LED and the third LED.

29. The method of claim 22, wherein the extended period of time is approximately 1.5 seconds, the allotted time period is approximately 20 seconds, and the plurality of LEDs are flashed approximately three times.

30. The method of claim 22, wherein the plurality of LEDs is a first LED, a second LED and a third LED and wherein the predetermined flashing pattern comprises the steps of:
    lighting the first LED, lighting the second LED and lighting the third LED in succession;
    lighting the third LED, lighting the second LED and lighting the first LED in succession; and
    simultaneously lighting the first LED, the second LED and the third LED.

31. The method of claim 23, further comprising the steps of:
    flashing the plurality of LEDs in an alternative flashing sequence, if the new highest speed has not been achieved; and
    displaying the speed achieved by the user.

32. The method of claim 31, wherein the alternative flashing sequence comprises the step of:
    lighting a first LED, lighting a second LED and lighting a third LED in succession approximately three times.

33. The method of claim 31, further comprising the steps of:
    determining whether the first switch or the second switch has been closed;
    if the first switch has been closed, returning to the step of displaying the last recorded speed on the liquid crystal display; and
    if the second switch has been closed, returning to the step of lighting the plurality of LEDs in accordance with the prescribed sequence.

34. The method of claim 21, wherein the speed calculations are performed in accordance with the relationship:

$$V = \frac{1}{n}\sum_{i=1}^{n} \frac{d}{t_i},$$

where $$T = \sum_{i=1}^{n} t_i,$$

d is the distance between each step, n is the total number of steps in the total running time T and $t_i$ is the time interval between steps taken by the user.

35. The method of claim 22, wherein the lighting of the LED, occurs in a first sequence, and operation of an option switch causes the LED lighting to occur in a different sequence.

* * * * *